US006862923B2

(12) United States Patent
Buguin et al.

(10) Patent No.: US 6,862,923 B2
(45) Date of Patent: Mar. 8, 2005

(54) ATOMIC FORCE MICROSCOPE

(75) Inventors: Axel Buguin, Paris (FR); Pascal Silberzan, Paris (FR)

(73) Assignee: Centre National de la Recherche Scientifique (C.N.R.S.), Paris Cedex (FR)

( * ) Notice: Subject to any disclaimer, the term of this patent is extended or adjusted under 35 U.S.C. 154(b) by 0 days.

(21) Appl. No.: 10/240,242

(22) PCT Filed: Mar. 30, 2001

(86) PCT No.: PCT/IB01/00529

§ 371 (c)(1),
(2), (4) Date: Apr. 2, 2003

(87) PCT Pub. No.: WO01/73791

PCT Pub. Date: Oct. 4, 2001

(65) Prior Publication Data

US 2003/0167830 A1 Sep. 11, 2003

(30) Foreign Application Priority Data

Mar. 31, 2000 (FR) ............................................ 00 04158

(51) Int. Cl.[7] .............................................. G01B 5/28
(52) U.S. Cl. ....................................... 73/105; 250/306
(58) Field of Search ........................... 73/105; 250/306; 324/244

(56) References Cited

U.S. PATENT DOCUMENTS

| 5,241,861 | A | | 9/1993 | Hulsing, II |
| 5,448,515 | A | * | 9/1995 | Fukami et al. .............. 365/171 |
| 5,461,907 | A | * | 10/1995 | Tench et al. .................. 73/105 |
| 5,513,518 | A | * | 5/1996 | Lindsay ....................... 73/105 |
| 5,515,719 | A | * | 5/1996 | Lindsay ....................... 73/105 |
| 5,670,712 | A | * | 9/1997 | Cleveland et al. ............ 73/105 |
| 5,753,814 | A | * | 5/1998 | Han et al. ..................... 73/105 |
| 5,856,617 | A | | 1/1999 | Gurney et al. |
| 5,900,729 | A | * | 5/1999 | Moser et al. ............... 324/244 |
| 6,064,201 | A | * | 5/2000 | Cha et al. ................... 324/228 |
| 6,297,502 | B1 | * | 10/2001 | Jarvis et al. ................ 250/307 |

FOREIGN PATENT DOCUMENTS

| EP | 0 866 307 A2 | 9/1998 |
| JP | 11-108941 | 4/1999 |
| WO | WO 99/06793 | 2/1999 |

OTHER PUBLICATIONS

Abstract only EP 052155444, Aug. 24, 1993.

* cited by examiner

Primary Examiner—Michael Cygan
(74) Attorney, Agent, or Firm—Young & Thompson

(57) ABSTRACT

This atomic force microscope has a probe for surface analysis of a sample (E), comprising a support body and an elastically deformable strip linked to the body, the strip being provided with a tip designed to come into contact with the sample (E) to be analysed. The microscope also has a mechanism for relative displacement of the analysis probe with respect to the surface of the sample (E), a detector for determining the position of the strip, and elements for vibrating the strip. These means for vibrating the strip include elements for conduction of electricity along a continuous path forming a loop, an alternating-current generator, and a magnetic-field source designed to set up a magnetic field ($\vec{B}$) in the region of the strip of the analysis probe.

15 Claims, 4 Drawing Sheets

ATOMIC FORCE MICROSCOPE

Figure 1:
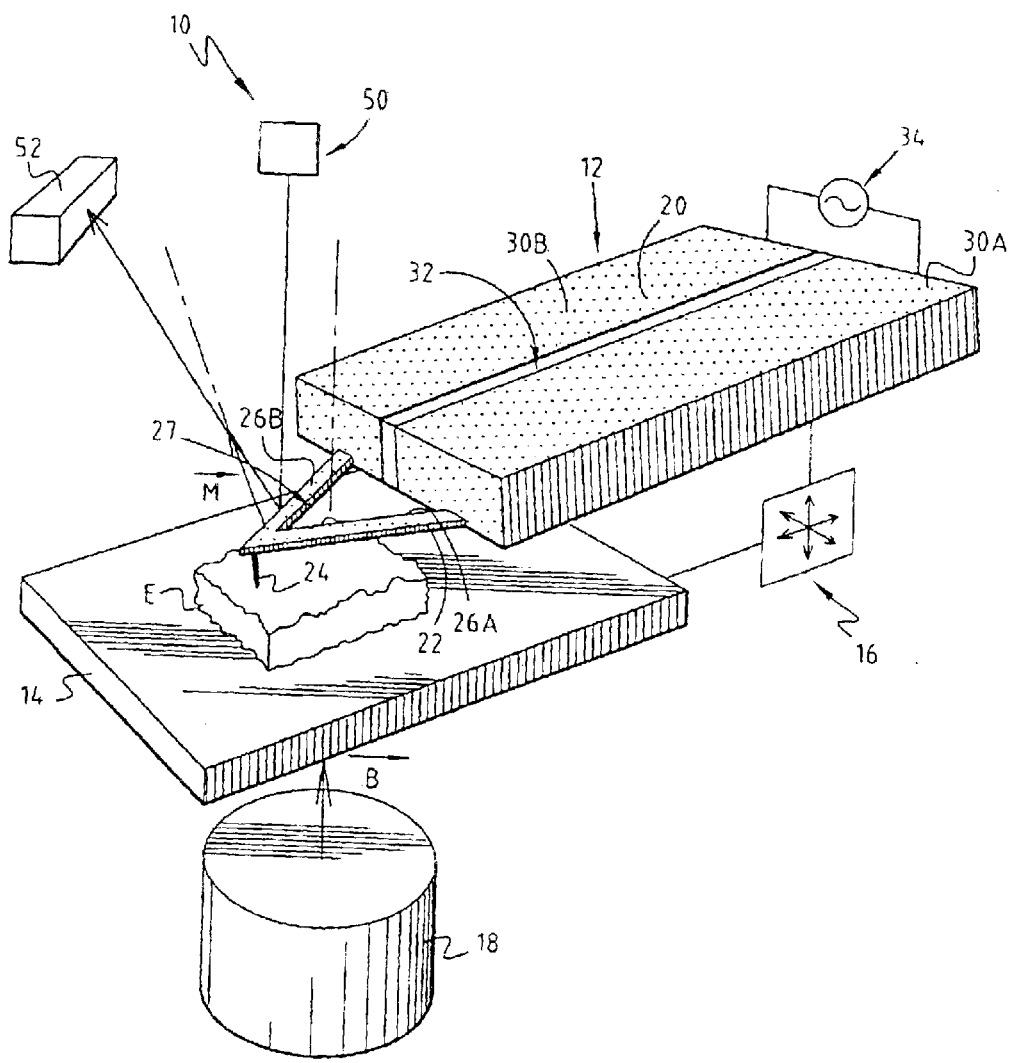

The present invention relates to an atomic force microscope, of the type having a probe for surface analysis of a sample, comprising a support body and an elastically deformable strip linked to the body, the strip being provided with a tip designed to come into contact with the sample to be analysed; a mechanism for relative displacement of the analysis probe with respect to the surface of the sample; a detector for determining the position of the strip; and means for vibrating the strip.

In an atomic force microscope, the probe for analysis of the surface and the sample are moved relative to one another along lines.

Such a probe has an elastically deformable strip carried at the end of a support body. This strip is commonly referred to by the English term "cantilever". At its free end, the strip has a tip designed to enter into contact with the surface of the sample to be analysed. The bending of the strip is measured, in particular by optical means, in order to determine the effects of the mechanical interaction between the surface being studied and the tip disposed at the end of the strip.

It is known, in order to reduce damage to the surface of the sample to be analysed, to vibrate the strip in a direction perpendicular to the plane of the sample, so that the tip taps the surface of the sample. The interactions of the tip with the surface generate changes in the amplitude response or phase response of the strip, and these provide access to the surface properties of the sample, such as topography or elasticity. This analysis mode is generally referred to by the term AC mode.

In order to vibrate the strip, it is known, in particular from the document WO-99/06793, to add a particle or a deposit of a magnetic material on the top of the strip, and to create an oscillating magnetic field in the space where the strip is displaced. This magnetic field is created, for example, by a coil through which an alternating current flows. This way of vibrating the strip is advantageous in comparison with conventional methods in which the vibration is induced mechanically, because it eliminates the resonances due to this mechanical system. This is particularly borne out for use in an aqueous medium.

The homogeneous deposition of a magnetic material on the strip is a difficult operation. Furthermore, this material changes the mechanical characteristics of the strip.

It is an object of the invention to provide an atomic force microscope, and a surface-analysis probe for this microscope, which can operate satisfactorily in a mode in which the strip is vibrated and in which the strip can be fabricated easily.

To that end, the invention relates to a microscope of the type already mentioned, characterized in that the means for vibrating the strip have, on the strip, means for conduction of electricity along a continuous path forming a loop, which electrical-conduction means are secured to the strip, the support body being provided with two divided conductive sections extending the loop, an alternating-current generator connected to the divided conductive sections of the analysis probe, and a magnetic-field source designed to set up a substantially homogeneous magnetic field in the region of the strip of the analysis probe.

The invention also relates to a microscope of the type already mentioned, characterized in that the detector has, on the strip, means for conduction of electricity along a continuous path forming a loop, which electrical-conduction means are secured to the strip, a magnetic-field source designed to set up a substantially homogeneous magnetic field in the region of the strip of the analysis probe, and means for analysis of currents induced by the magnetic field in the loop.

One or other of these microscopes according to the invention may have, in any technically feasible combination, one or more of the characteristics described in claims 2 and 4 to 12.

Figure 2:
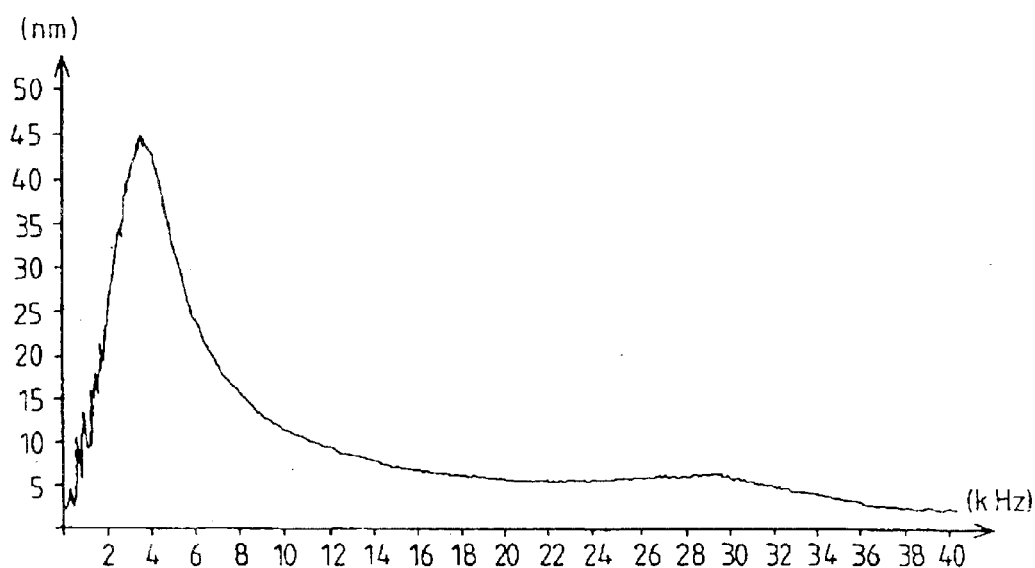
Figure 3:
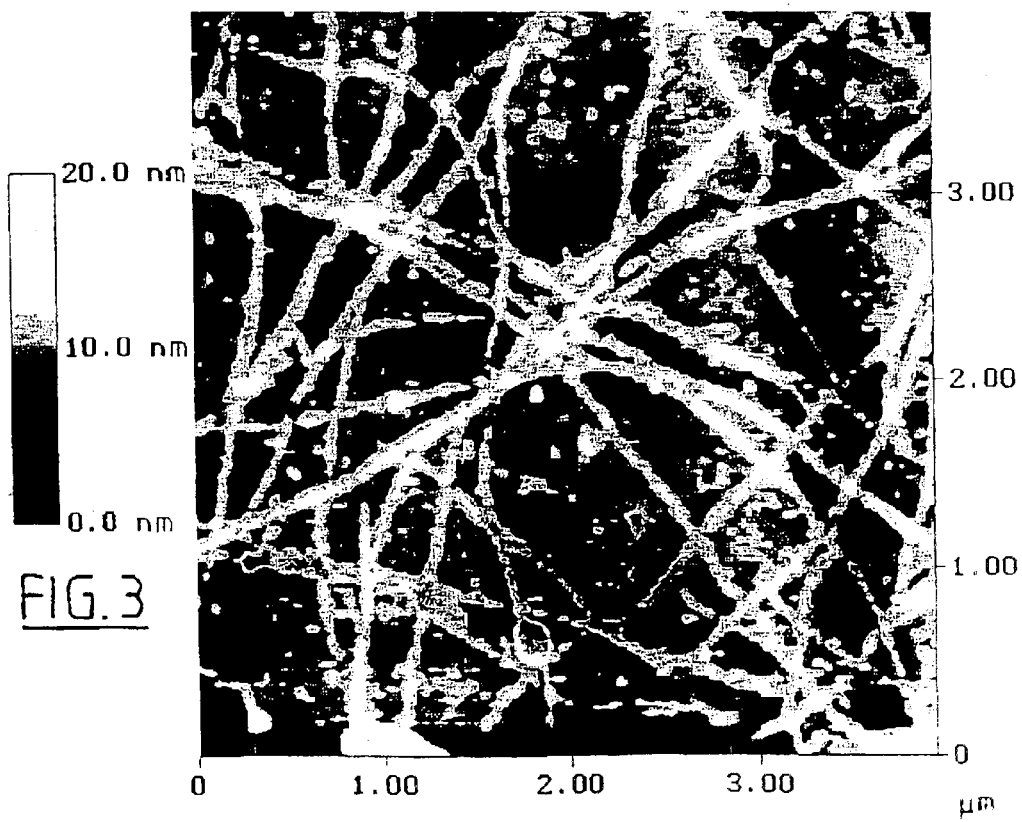
Figure 4:
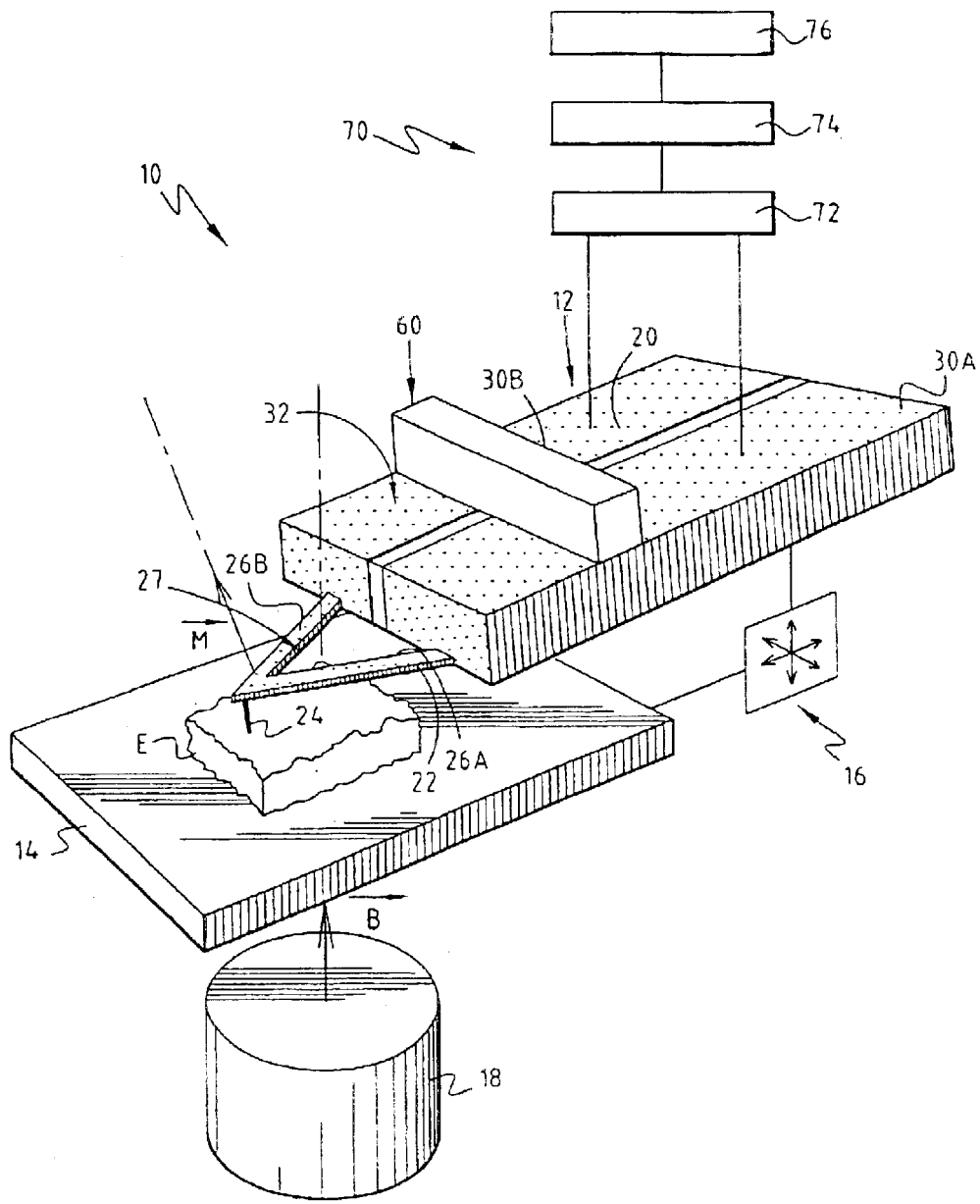
Figure 5:
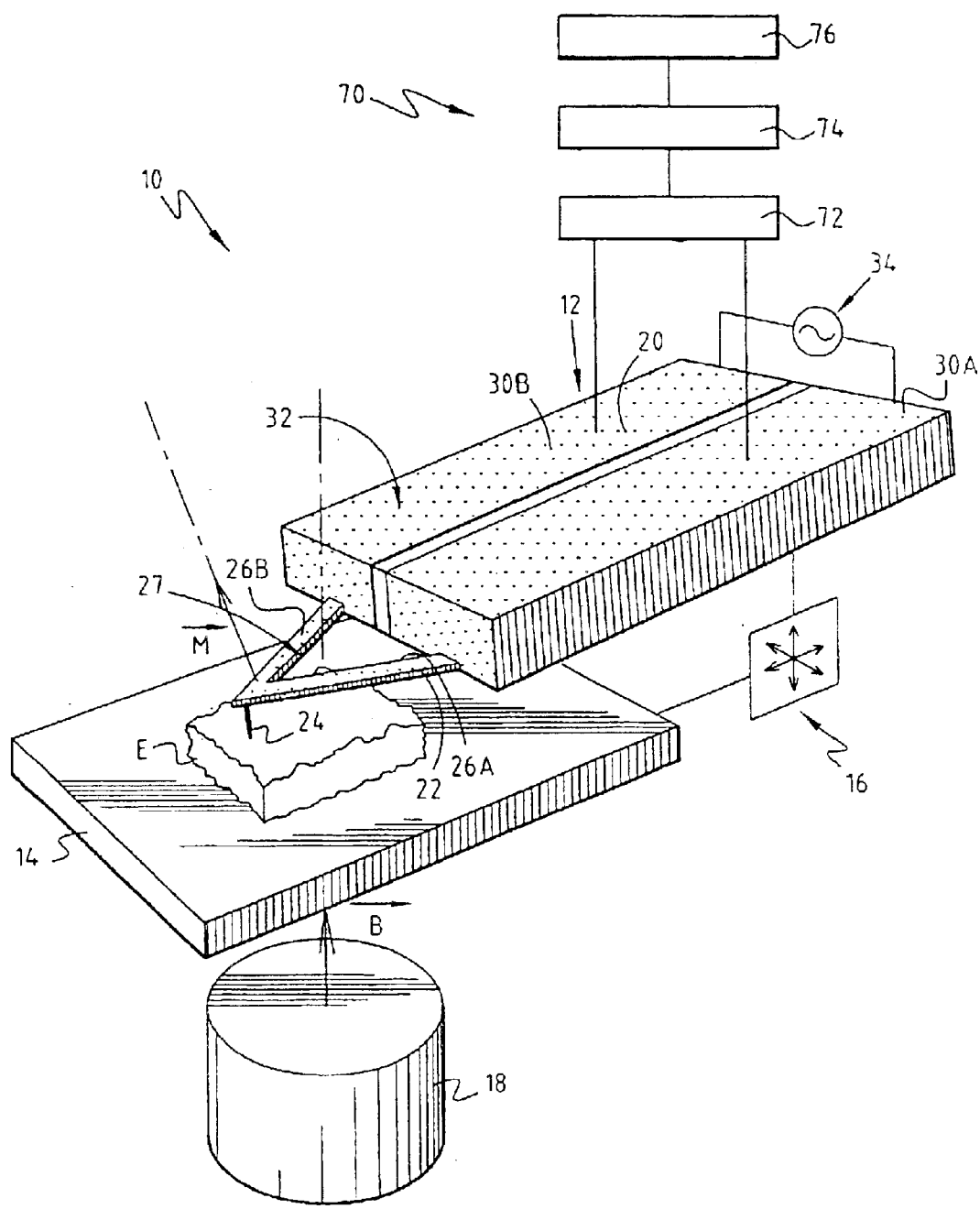

The invention will be, understood more clearly on reading the following description, which is provided by way of example and is given with reference to the drawings, in which:

FIG. 1 is a diagrammatic view of the surface-analysis probe arranged in a microscope according to the invention;

FIG. 2 is a view showing the change in the amplitude of the vibrations of the elastic strip of an exemplary embodiment of an analysis probe in the presence of an excitation current whose frequency varies from 0 to 40 kHz; and FIG. 3 is an image of a sample obtained with a microscope using a probe according to the invention; and FIGS. 4 and 5 are views similar to the one in FIG. 1, each illustrating an embodiment of a variant of a microscope according to the invention.

The atomic force microscope 10, only the main elements of which are represented in FIG. 1, has a probe 12 for analysis of the surface of a sample E. The microscope furthermore has a movable table 14 for supporting the sample. This table 14 can be moved, in three orthogonal directions, relative to the analysis probe 12 under the action of displacement means 16 of any suitable type. These means produce relative displacement of the probe 12 with respect to the sample E substantially in the plane of the surface of the sample E. They are designed to make it possible to scan the surface of the sample with the probe 12.

The microscope 10 furthermore has a permanent magnet 18 which is preferably arranged under the movable table 14. This permanent magnet 18 is capable of creating a permanent magnetic field $\vec{B}$ in the region of observation of the sample. The magnet is selected so that the field $\vec{B}$ is set up substantially homogeneously in the region where the analysis, end of the probe is displaced. This field $\vec{B}$ is substantially perpendicular to the surface of the sample, i.e. to the direction in which the sample is scanned by the probe.

The analysis probe 12 has a support body 20 which permits mechanical linkage of the probe to the structure of the atomic force microscope and, more precisely, to the displacement means 16 integrated therein.

The support body 20 has a parallelepipedal overall shape and is essentially made of glass or "pyrex". One side face of the support body 20 is extended by an elastically deformable strip 22. This strip is obtained by subsequent deposition on the body of silicon nitride $Si_3N_4$. The strip 22 has a small thickness which is very much less than that of the body, hence permitting its elastic deformation. Its thickness is, for example, 1 μm. The length of the strip is, for example, 200 μm.

The strip 22 is essentially flat and extends parallel to the surface of the body 0.20. The strip is secured to the body 20 only at one end. It is hence cantilevered.

The analysis probe is carried in the microscope by a support which ensures that the strip 22 is slightly inclined relative to the surface of the sample E. The normal to the strip 22 is, for example, inclined by about 10° relative to the normal to the overall plane of the sample E. The normal to the plane 22 hence defines an angle of about 10° with the magnetic field $\vec{B}$.

At its free end, the strip 22 carries a tip 24 designed to enter into contact, in an aqueous medium, with the sample E to be analysed. The tip extends perpendicularly to the plane of the strip 22. The radius of curvature of the tip 24 is about 30 nm at its extreme end.

The strip 22 advantageously has two coplanar branches 26A, 26B which converge towards each other. These two branches have distinct roots, where they are linked to the support body 20. Their other ends are linked to each other by a junction bend, where the tip 24 is carried.

According to the invention, the strip 22 is provided with means for conduction of electricity along a continuous path forming a loop 27 which extends over the essential part of the length of the strip. This loop is secured to the said strip.

In the embodiment which is represented, these electrical-conduction means are formed by a conductive coating which covers at least one of the faces of the strip, so as to create a conductive path. This coating is advantageously a metal coating, preferably consisting of gold. Its thickness is between 5 nm and 500 nm and is advantageously substantially equal to 50 nm.

The loop 27 formed by the metal coating extends along the two branches 26A, 26B. It is therefore formed by a single turn which is open in the region of the support body 20.

This loop is extended by divided conductive sections 30A, 30B disposed on the surface of the support body 20. These conductive sections are formed by a conductive coating extending over the main surface of the body, and over its side surface to which the strip 22 is connected. Advantageously, the conductive coating extending over the support body is of the same nature as the coating applied-to the strip. They are preferably formed simultaneously and constitute a single coating extending both over the strip and over the support body.

The sections 30A and 30B are separated from each other by an insulating area 32 free of conductive coating.

According to the invention, an alternating electric-current generator 34 is connected between the two conductive areas 30A and 30B. To that end, conductive pads forming the terminals of the generator 34 are held applied to the conductive sections 30A and 30B, the latter hence forming, in the region where the conductive pads are applied, means for connection of the loop 27 to the alternating-current generator 34.

The electric current which is delivered by the generator and flows through the loop 27 is preferably sinusoidal and its strength is between 0.01 and 100 mA.

Lastly, the atomic force microscope has a light source 50 which illuminates the surface carrying the metal coating of the strip 22, as well as a receptor 52 for detecting the position of the reflected beam. The emitter 50 and the receptor 52 are designed, as is known per se, to determine the change in the deflection of the elastic strip 22.

The atomic force microscope operates in the following way.

During the analysis of the surface of a sample E, the alternating-current generator 34 is turned on, hence causing an oscillating electric current to flow through the loop 27 formed by the conductive coating carried by the strip 22.

The flow of the alternating electric current through this loop creates a variable magnetic moment $\vec{M}$. At each instant, the presence of the magnetic field $\vec{B}$ generated by the permanent magnet 18 imposes stresses on the strip 22, the magnetic moment $\vec{M}$ thereof tending to align with the magnetic field $\vec{B}$. In other words, the current loop formed on the strip is subjected to Laplace forces which are transmitted to the strip 22, the latter being mechanically secured to the loop. The stresses applied to the strip result in continual deformation of the latter, as a function of the change in the magnetic moment $\vec{M}$.

Because of the periodic reversal of the direction of the current set up in the loop by the alternating-current generator 34, the magnetic moment reverses at each half-period of the generator, hence creating oscillation of the strip 22 and, in particular, of its end carrying the tip 24.

Advantageously, the frequency of the alternating-current generator 34 is set to the resonant frequency of the strip 22, or close to this frequency.

FIG. 2 represents the vibration amplitude of the strip 22 immersed in water, for a current of the order of 1 mA flowing through the loop 27, as a function of frequency.

In this figure, the frequency in hertz is given on the abscissa, whereas the amplitude of the oscillations in nanometres is represented on the ordinate.

The sinusoidal current flowing through the turn is frequency-modulated between 0 and 40 kHz and its peak strength is about 1 mA. The well-defined amplitude maximum observed at about 4 kHz corresponds to the natural vibration frequency of the strip, i.e. to its resonant frequency.

The strip which is used has a stiffness constant of the order of 50 mN/m. The current loop was produced by depositing a 50 nm gold film on the lower face of the strip, i.e. the face from which the tip emerges.

The very large amplitude observed for the vibrations is commensurately higher if the frequency of the generator is close to the natural resonant frequency of the strip.

FIG. 3 represents an image of the topography of actin filaments deposited on the surface of a glass slide, the image having been taken with the proposed probe by using a suitable atomic force microscope. Each grey level of this image corresponds to an "altitude" on the sample, as indicated by the scale.

This image is taken in water using the AC mode.

The excitation of the resilient strip is generated by virtue of a sinusoidal current flowing through the loop carried by the strip, with a peak strength of the order of 1 mA. Its frequency is set at 3.7 kHz (close to the natural frequency). The output signal obtained on the photodetector is about 5 Vrms, corresponding to a vibration amplitude of about 40 nm.

With a device as described here, it will be understood that the vibration of the strip in an atomic force microscope is simplified since it only requires the installation of a permanent magnetic-field source and an alternating-current generator. Furthermore, the placement of a conductive coating on the surface of the strip 22 is a well-mastered technique which is commonly used in the semiconductor industry, where the deposition of a metal coating is a standard operation.

In an alternative embodiment of the microscope, the position of the magnet 18 creating the magnetic field $\vec{B}$ is modified. In particular, the magnet is not placed with its axis substantially perpendicular to the surface of the sample to be analysed. Instead, the magnet is disposed in such a way as to produce a magnetic field whose direction extends parallel to the surface of the sample to be analysed, specifically in a direction parallel to the longitudinal mid-axis of the strip.

Under these conditions, when a sinusoidal current flows through the loop 27 carried by the strip, the strip 22 experiences twisting about its longitudinal mid-axis. Hence, under the action of the reciprocating torsional movement of the strip, the tip 24 executes reciprocating local scanning of the surface of the sample, hence making it possible to measure the frictional properties of the surface of the sample.

These frictional properties are deduced from analysis of the movement of the light beam reflected by the strip.

In a variant of the microscope according to the invention, the sample E to be analysed is fixed and the analysis probe 12 can be moved relative to this sample under the action of displacement means of any appropriate type. The operation of the microscope is then substantially similar to that of the microscope in FIG. 1.

According to an alternative embodiment, which is not shown, a plurality of strips which are substantially similar to one another are organized on the same probe. Each strip is provided with its own electrical-conduction loop, each loop being supplied in parallel by the alternating-current generator. Advantageously, the microscope has means for generating a substantially homogeneous magnetic field $\vec{B}$ in the region where the analysis ends of these strips are displaced. These means are formed, for example, by a correspondingly dimensioned permanent magnet. During the displacement of the probe, since an alternating current flows through each strip, it will be understood that each strip vibrates independently. During the same scanning pass by the probe, the bending of each of the strips is measured, which makes it possible to scan the surface to be analysed more quickly.

Furthermore, according to yet another variant, the microscope does not have an external strip-position detector such as the optical system with light beams 50, 52 in FIG. 1.

According to a first embodiment of this variant, which is represented in FIG. 4, the loop 27 is not connected to an alternating-current generator. However, a component 60 for mechanical excitation of the strip is applied to the probe. This mechanical-excitation component is composed of, for example, an auxiliary piezoelectric mechanism which vibrates the strip 22 carrying the loop.

The loop 27 is connected to means 70 for processing the signal due to the induced currents. In particular, these means have amplification means 72 associated with means 74 for measurement of the voltage and/or the strength of the current in the loop 27, as well as means 76 for analysis of the amplified signals. Advantageously, the magnetic field $\vec{B}$ produced by the source 18 is very high, being more than 0.2 T and, for example, equal to 1 T.

During the relative displacement of the probe 12 above the sample E to be analysed, since the strip 22 of the probe is mechanically excited, the oscillation of the loop 27 in the magnetic field $\vec{B}$ gives rise, in the loop, to an electromotive force which generates induced currents. This electromotive force is analysed by the signal-processing means 70 connected to the terminals of the loop. The analysis of the signals amplified by the aforementioned means 76 makes it possible to determine the profile of the surface under analysis, the electromotive force being representative of the interaction by contact between the measurement end of the probe and the sample surface to be analysed.

According to another embodiment, which is represented in FIG. 5, the piezoelectric excitation mechanism is absent and, in addition to the signal-processing means 70, the loop 27 is connected to an alternating-current generator 34 as in the embodiment in FIG. 1.

During the analysis, the generator 34 causes an alternating current to flow through the loop 27. Under the action of the flow of this current, the strip 22 is made to vibrate, and to enter into contact with the surface to be analysed during the relative displacement of the probe 12.

Because of the oscillatory movement of the loop 27 in the magnetic field $\vec{B}$, a back electromotive force is formed in the loop and generates induced currents therein. This back electromotive force is analysed by the signal-processing means 70, in order to deduce therefrom the profile of the surface of the analysed sample.

In practice, it will be understood that the electromotive force or the back electromotive force produced in the loop 27 has a voltage of between 0.1 nV and 10 nV, corresponding to a strength of between 1 pA and 10 nA, for example, a voltage of about 1 nV corresponding to a strength of about 100 pA.

With such means for detection of the deformation of the strip 22, it is hence possible to determine the profile of the surface to be analysed without employing optical means.

What is claimed is:

1. Atomic force microscope, comprising a probe (12) for surface analysis of a sample (E), comprising a support body (20) and an elastically deformable strip (22) linked to the body (20), the strip being provided with a tip (24) designed to come into contact with the sample (E) to be analysed;

a mechanism (16) for relative displacement of the analysis probe (12) with respect to the surface of the sample (E);

a detector (50, 52) for determining the position of the strip (22); and means for vibrating the strip (22), said means for vibrating the strip comprising:

on the strip (22), means (26A, 26B) for conduction of electricity along a continuous path forming a loop (27), which electrical-conduction means (26A, 26B) are secured to the strip (22), the support body (20) being provided with two divided conductive sections (30A, 30B) extending the loop (27), an alternating-current generator (34) connected to the divided conductive sections (30A, 302) of the analysis probe (12), and a magnetic-field source (18) designed to set up a substantially homogeneous magnetic field ($\vec{B}$) in the region of the strip (22) of the analysis probe (12), wherein the loop (27) has a single turn which is open in the region of the support body (20).

2. Microscope according to claim 1, wherein the detector has means (76) for analysis of currents induced by the magnetic field ($\vec{B}$) in the loop (27).

3. Microscope according to claim 1, wherein the strip (22) has two branches (26A, 26B) which converge towards each other from divided roots for linkage to the support body (20) as far as a junction bend which carries the tip (24), and wherein the continuous path forming the loop (27) extends along the length of the two branches (26A, 26B).

4. Microscope according to claim 1, wherein the electrical-conduction means have a conductive coating which is formed on one face of the strip (22) and extends over the support body (20) to form the two divided conductive sections (30A, 302), the latter being separated by a coating-free area (32) of the body.

5. Microscope according to claim 1, wherein the magnetic-field source (18) is designed to set up a permanent magnetic field ($\vec{B}$) in the region of the strip (22).

6. Microscope according to claim 1, wherein the alternating-current generator (34) has means for controlling the frequency of the current, which are designed to bring the latter to a frequency substantially equal to the resonant frequency of the strip (22).

7. Microscope according to claim 1, wherein the magnetic-field source (18) is arranged to set up a magnetic field ($B$) whose direction extends substantially transversely to the plane of the strip (22).

8. Microscope according to claim 1, wherein the magnetic-field source is arranged to set up a magnetic field whose direction extends substantially along the longitudinal mid-axis of the strip.

9. Microscope according to claim 1, wherein, in use, the means for vibrating the strip (22) create a mechanical interaction between the surface of the sample (E) and the tip (24) of the strip (22).

10. Microscope according to claim 1, wherein the radius of curvature of the tip (24) is about 30 nm at its extreme end.

11. Microscope according to claim 1, wherein, in use, the flow of an alternating electric current from the generator (34) through the loop (27) creates a variable magnetic moment ($M$) which leads to align with the magnetic field ($B$) set up by the magnetic field source (18) and which consequently deforms the strip (22) in a vibration.

12. Microscope according to claim 1, wherein the single turn of the loop (27) extends along two branches which are distinct at a part of the strip (22) linked to the body (20).

13. Microscope according to claim 1, wherein the single turn of the loop (27) extends over the length of the strip (22).

14. Microscope according to claim 1, wherein the electrical-conduction means (26A, 26B) forming the single turn of the loop (27) have a thickness between 5 nm and 500 nm.

15. Microscope according to claim 1, wherein said single turn of the loop (27) is disposed on at least one surface of the strip (22).

* * * * *

UNITED STATES PATENT AND TRADEMARK OFFICE
CERTIFICATE OF CORRECTION

PATENT NO.        : 6,862,923 B2
APPLICATION NO. : 10/240242
DATED              : March 8, 2005
INVENTOR(S)       : Axel Buguin et al.

It is certified that error appears in the above-identified patent and that said Letters Patent is hereby corrected as shown below:

Change the Cover sheet (73) assignee from "Centre National de la Recherche Scientifique (C.N.R.S.)" to --Institut Curie, 26 Rue d'Ulm, Paris Cedex 05, France 75248--.

Signed and Sealed this

Eleventh Day of July, 2006

JON W. DUDAS
*Director of the United States Patent and Trademark Office*